Nov. 25, 1941.    W. F. BOKUM ET AL    2,264,236
PRODUCTION AND TREATMENT OF BAST FIBERS
Filed April 27, 1939    8 Sheets-Sheet 2
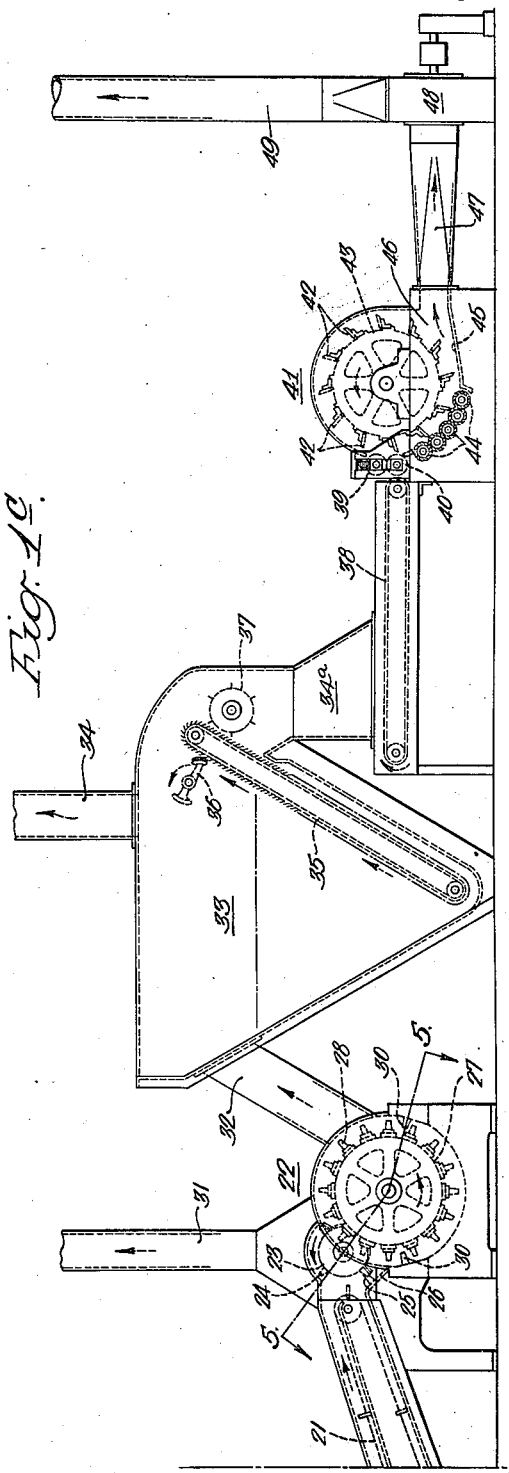
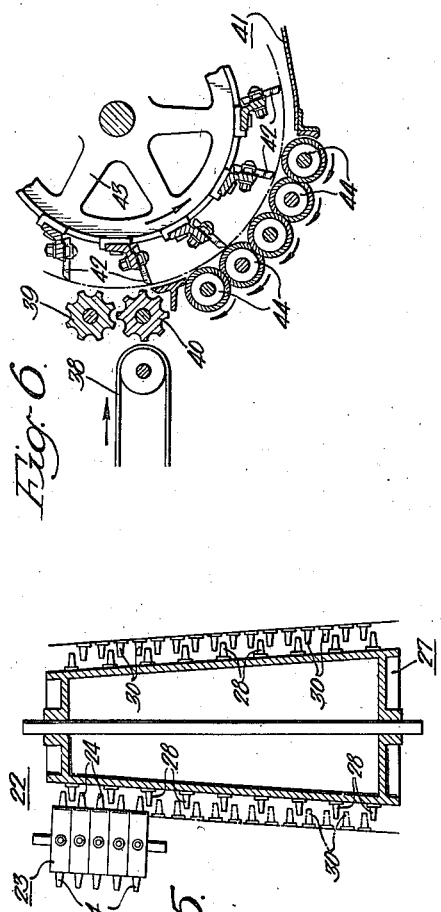
Inventors:
William F. Bokum
John H. Senior
by their Attorneys
Howson & Howson Nov. 25, 1941. W. F. BOKUM ET AL 2,264,236
PRODUCTION AND TREATMENT OF BAST FIBERS
Filed April 27, 1939 8 Sheets-Sheet 3
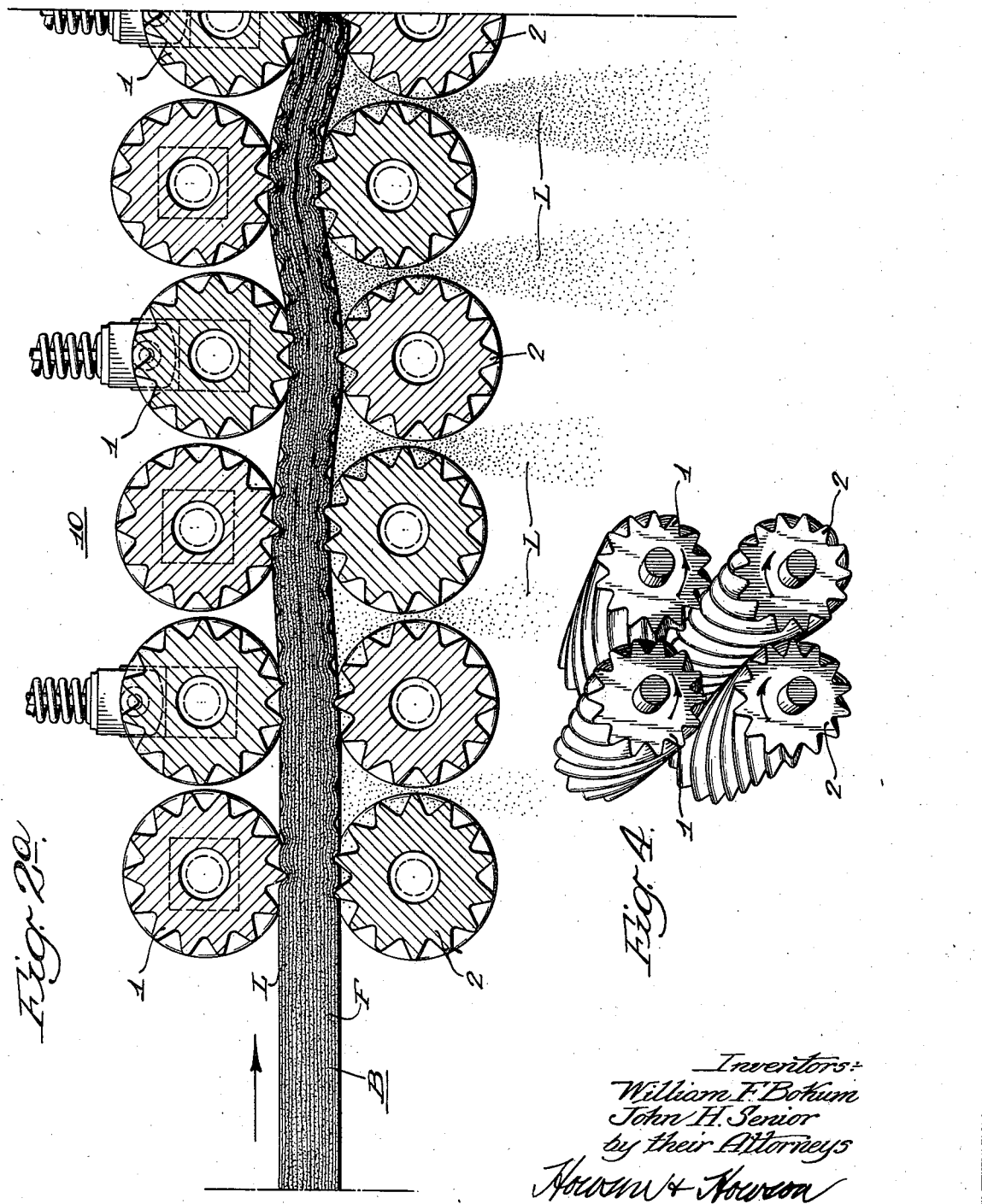

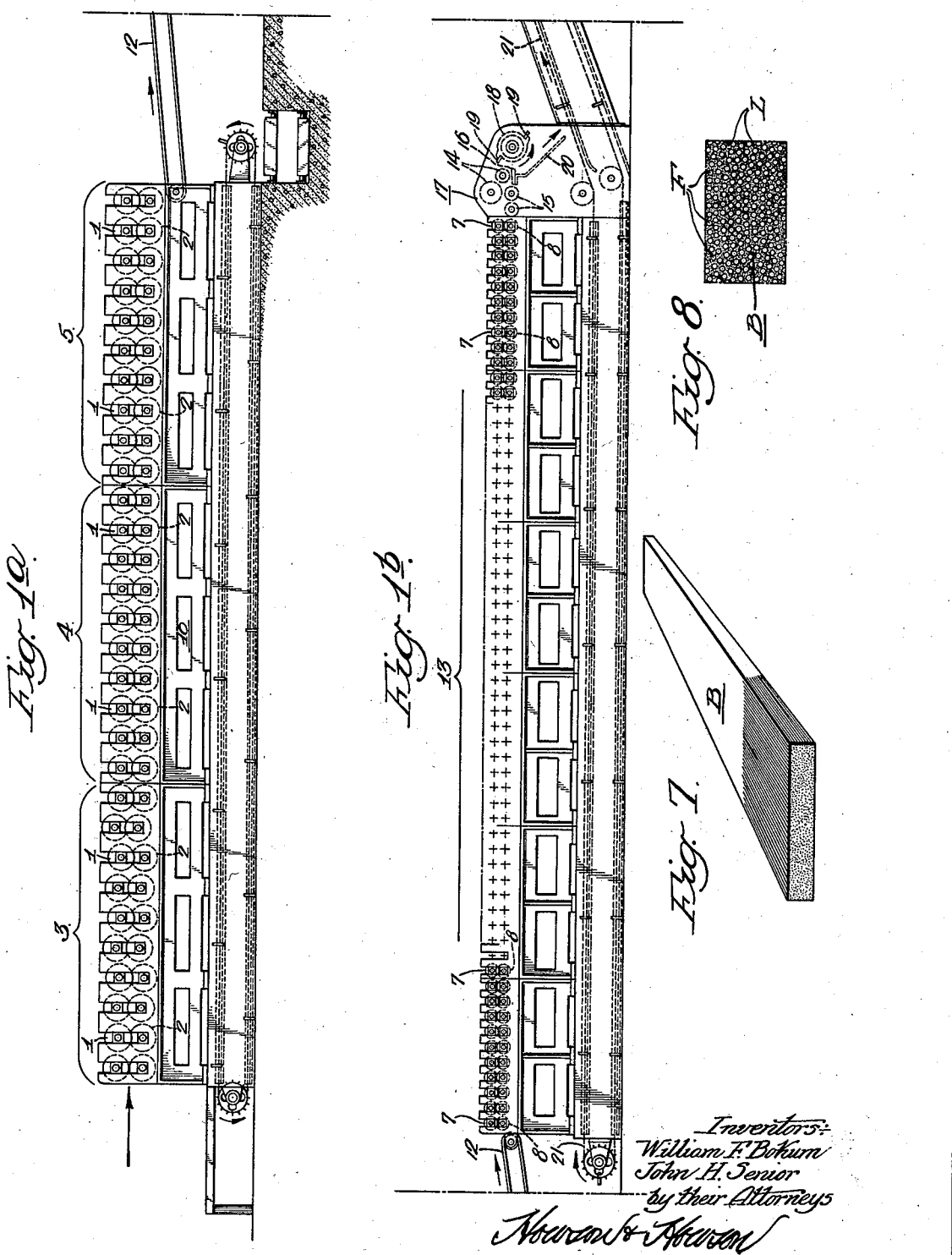

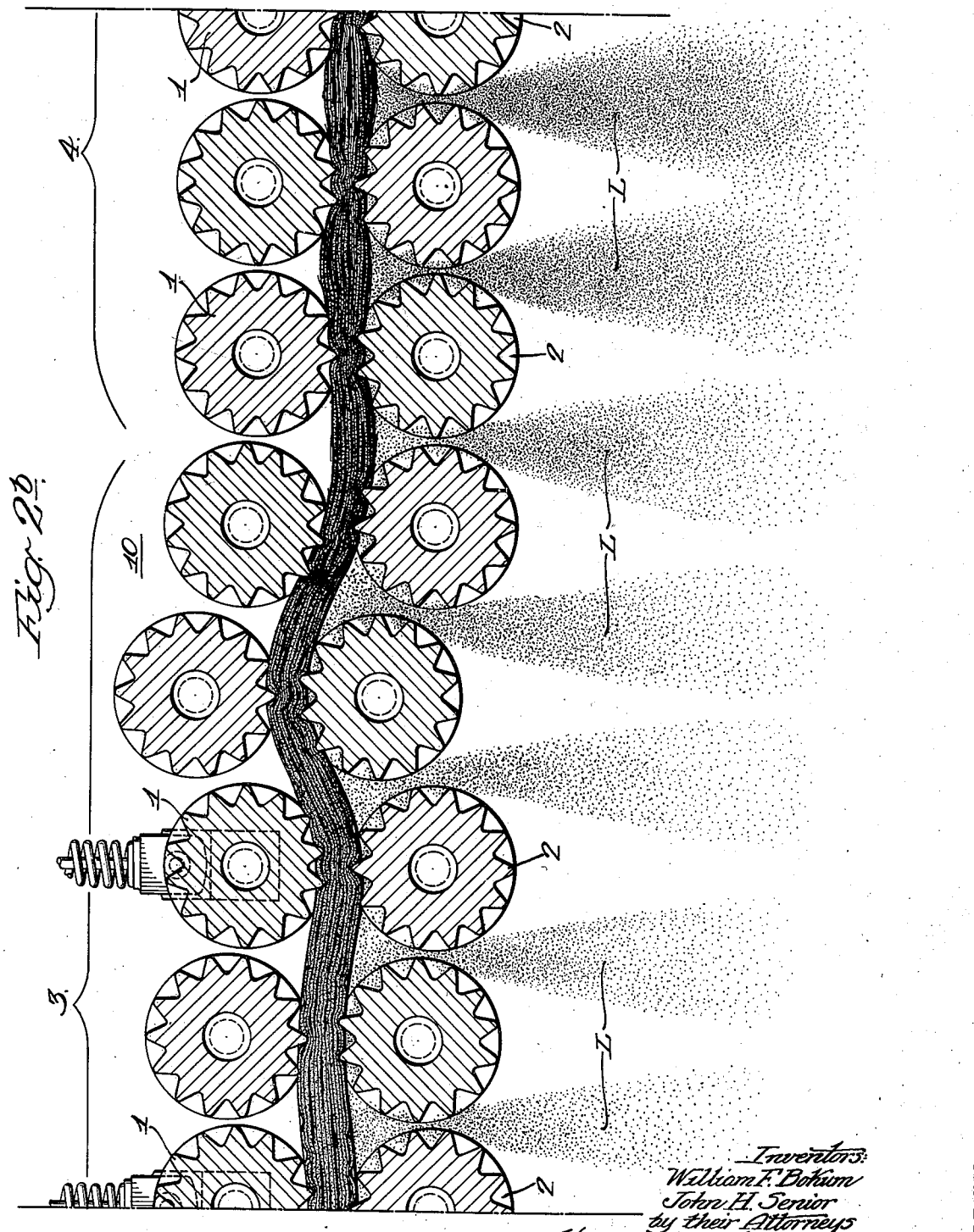

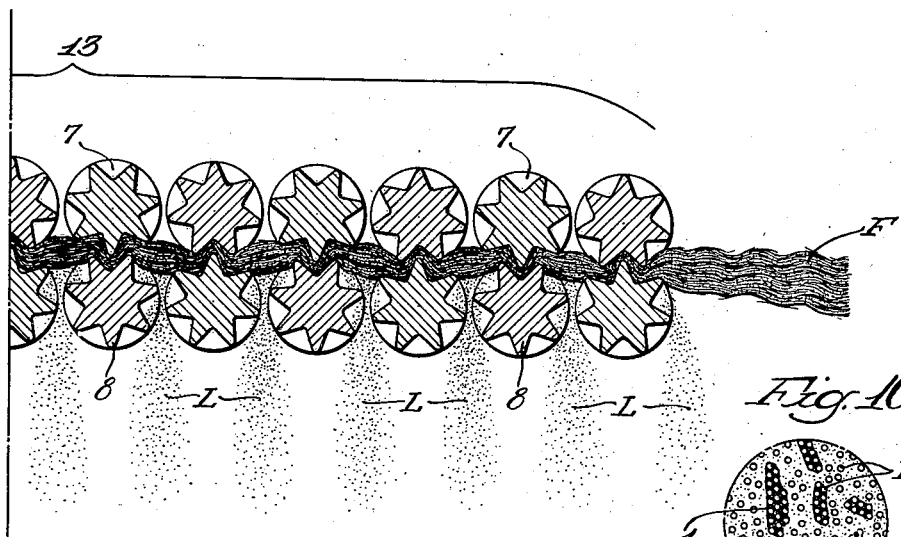
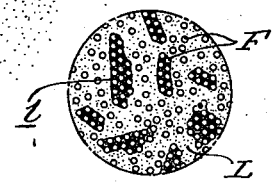
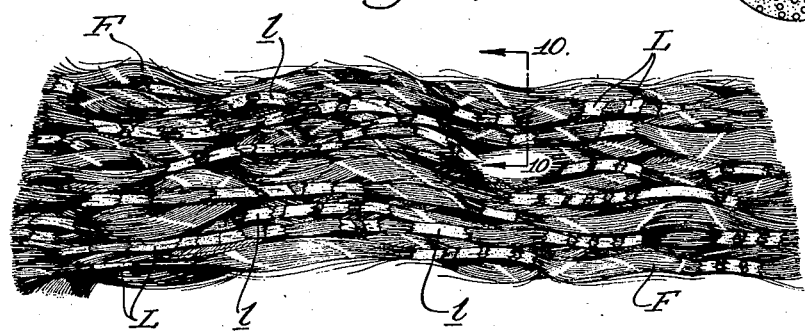
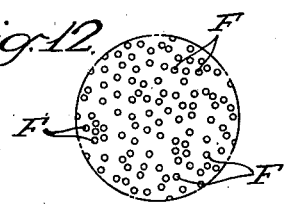
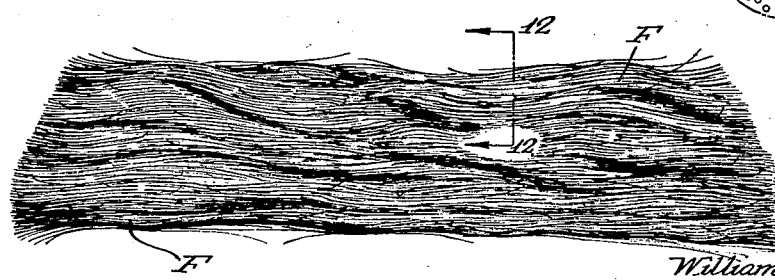

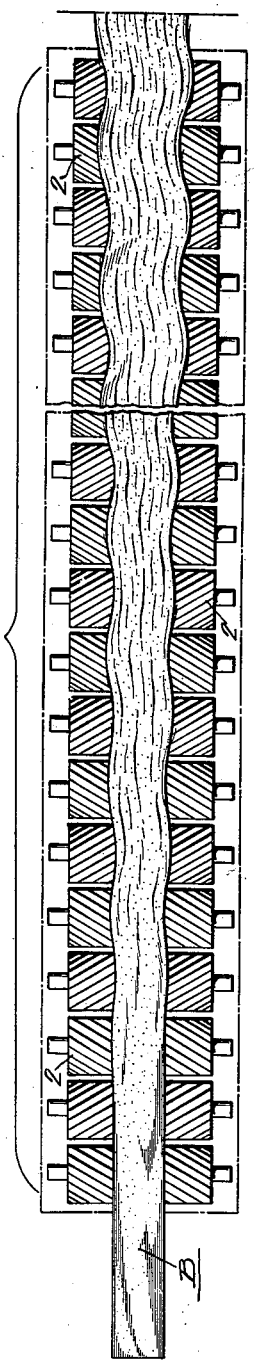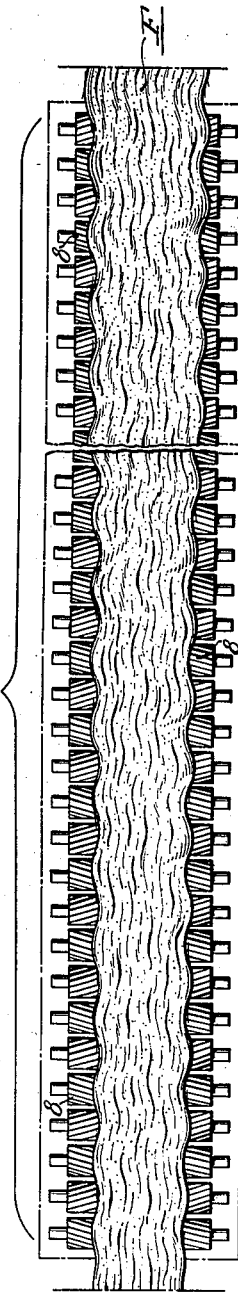

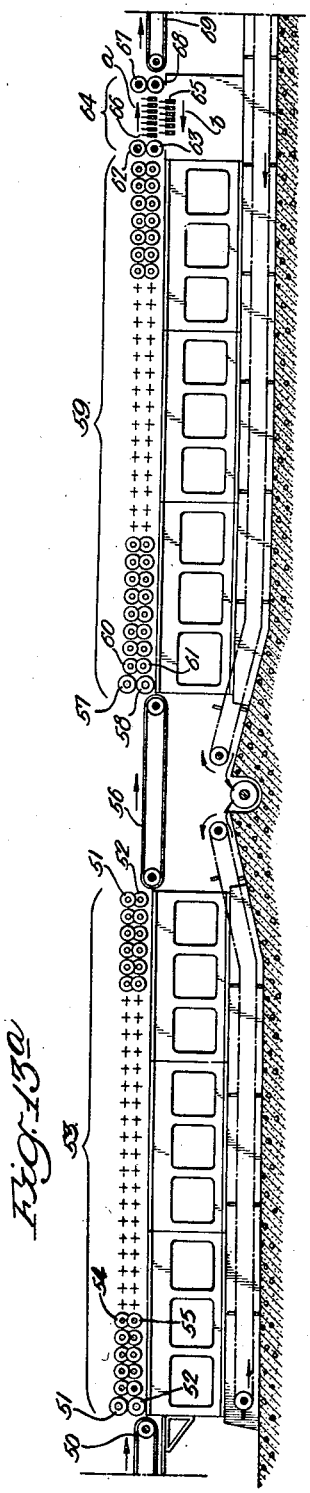

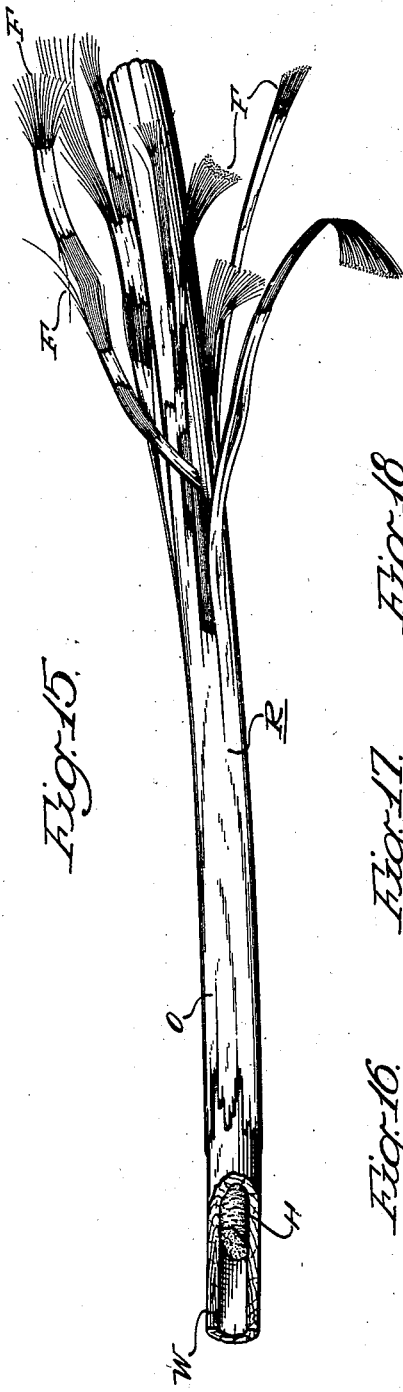

Patented Nov. 25, 1941

2,264,236

UNITED STATES PATENT OFFICE 2,264,236

PRODUCTION AND TREATMENT OF BAST FIBERS

William F. Bokum, Jenkintown, and John H. Senior, Philadelphia, Pa., assignors to Proctor & Schwartz, Incorporated, Philadelphia, Pa., a corporation of Pennsylvania Application April 27, 1939, Serial No. 270,420

1 Claim. (Cl. 19—24)

This invention relates to a process for treating raw fibrous vegetable matter to extract and refine the fiber content thereof for subsequent use as a textile stock capable of being formed into threads etc., alone or mixed with other fibrous stock of the animal, vegetable, or mineral varieties, or with synthetic filaments.

The present invention more particularly relates to the extraction and refinement of what are known as "bast" fibers, i. e., fibers contained in the bark of various trees, such as the bark of the California redwood etc., or in the bark of other plants, such as found on the stems or reeds of ramie and kindred varieties of wild or cultivated vegetation.

In the case of the California redwood, the bark has been used for thermal insulation, sound dampening, and other purposes by breaking up or crushing the whole into small conglomerate masses composed of the fine fibers and the lignin which forms the natural binder for the fibers. Subsequent handling or conditions of use cause the lignin to break down into a fine powder, which is objectionable for many reasons. The very presence of the lignin lowers the value of the product as a thermal insulation and renders the fibers useless as a textile stock.

Prior to the present invention it has been considered practically impossible to extract the fibers from the lignin, or vice versa, because of the relatively low tensile strength of the fibers. This circumstance has also been responsible for lack of interest in the redwood fibers as a textile stock. It has been found, however, that if and when the fibers are freed from the lignin they have a natural tendency to curl. This increases their efficiency as a thermal insulation stock. Furthermore, this natural curling of the fibers renders them suitable for mixing with other fibers having greater tensile strength, such for example, as wool fibers. It has been found that the cleaned redwood fibers may be mixed with wool fibers up to as high as a 40-60 percentage for practical purposes in the making of woolen yarns for use in overcoatings, suitings, and other kinds of woolen goods.

In the case of ramie, the fibers have been heretofore prepared for use as a textile stock by long tedious hand processes. The cut reeds, stalks or stems have been gathered and bundled by Chinese peasants, etc. and placed in stagnant creeks, pools or rivers for several weeks, until natural disintegration of the components begins. This softens the bark to an extent wherein it may be manually peeled from the underlying wood. The gatherers then work the bark by hand until the fibers are substantially free of the partially disintegrated lignin which binds the fibers together. The fibers are then laid out to dry and subsequently bunled for shipment to industrial centers for further refining, spinning, and weaving.

The object of the present invention is to provide a process for extracting and refining the bast fibers of redwood, ramie, and kindred vegetation from the raw state to finished stock suitable for the uses above noted and others which will eliminate the undesirable characteristics of the materials and the process by which the materials have heretofore been prepared for use.

In the accompanying drawings:

Figs. 1a, 1b and 1c combined, illustrate in a more or less diagrammatic manner, a side elevation of one form of apparatus capable of carrying out the process according to the principles of the present invention;

Figs. 2a, 2b, 2c combined, illustrate a longitudinal sectional elevation of one portion of the apparatus shown in Figs. 1a and 1b;

Figs. 3a and 3b combined illustrate a diagrammatic plan view of the apparatus of Figs. 1a, 1b, 2a and 2b;

Fig. 4 is a detail perspective view of two pairs of rolls used in the apparatus;

Fig. 5 is a diagrammatic sectional plan view taken on the line 5—5, Fig. 1c;

Fig. 6 is a fragmentary sectional elevation of a portion of the apparatus shown in Fig. 1c;

Fig. 7 is a perspective view of a slab of redwood bark prior to undergoing treatment according to the present process;

Fig. 8 is a diagrammatic cross section or end view, greatly magnified, of the slab shown in Fig. 7;

Fig. 9 illustrates a portion of the slab of Fig. 7 after undergoing part of the present process;

Fig. 10 is a cross section, greatly magnified, taken on the line 10—10, Fig. 9;

Fig. 11 is a view of the slab fragment of Fig. 9 after undergoing further steps of the process;

Fig. 12 is a cross section, greatly magnified, taken on the line 12—12, Fig. 11;

Figs. 13a and 13b combined show another arrangement of apparatus capable of carrying the present process;

Fig. 14 shows a sectional elevation of a portion of the apparatus shown in Fig. 13b;

Fig. 15 shows a piece of ramie or similar stem prior to undergoing treatment according to the present process;

Figs. 16, 17, 18, 19, 20, 21, 22 and 23 respectively show steps in the treatment of the stalk disclosed in Fig. 15.

In the case of redwood bark, the bark is first cut into boards of any desired measurements, such for example, as about one inch thick, 10 or 12 inches wide and 10 or 12 feet long, one of which is illustrated at B in Fig. 7. The bark is composed of long fibers F which are bound together by a substance known as lignin, which is diagrammatically shown at L in Fig. 8.

The boards B are first passed through what is herein termed a breaker 10, by being fed between a first pair of large heavy spirally fluted upper and lower breaker rolls 1 and 2 of a preliminary series or set 3, shown in Figs. 1a and 2a. In this preliminary set 3 the succeeding pairs of rolls 1—2 are staggered at different elevations, one up and one down, alternately, to flex the boards B vertically, first in one direction and then in the opposite direction. This vertical flexing causes a partial breaking down of the solid lignin L which falls from the then partially disintegrated board B in powder form, as indicated by the stippling in Figs. 2a, 2b and 2c.

The spiral flutings on the roll pairs 1—2 tends to flex the board B laterally in opposite directions alternately, at the same time as it is being flexed vertically in opposite directions alternately. However, while passing through the preliminary set 3, comparatively little of the lignin L is removed so that there is correspondingly little lateral flexing. The lateral flexing starts to take place after the lignin has broken down to some appreciable extent. The lateral flexing is clearly illustrated in Figs. 3a and 3b.

In the preliminary set 3 the boards B, due to the alternate vertical flexings and the pressure exerted by each pair of rolls 1 and 2, becomes more or less crushed, leaving the fibers F in a stringy mass bound together by more or less relatively spaced gobs of lignin which have not as yet disintegrated. These gobs are shown at $l$ in Figures 9 and 10.

From the preliminary set 3, the fibrous mass passes to working sets 4 and 5 of roll pairs 1 and 2. In these working sets the axes of the lower rolls 2, 2 are all in substantially the same horizontal plane, and the upper rolls 1, 1 press the mass down firmly against the lower rolls 2, 2. The axes of the rolls 1, 1 likewise assume substantially a horizontal single plane.

The lateral flexing becomes more pronounced in the working roll sets 4 and 5, which causes a further break down of the gobs $l$ of lignin L, leaving the mass more or less flexible and permitting the fibers F to be vertically bent abruptly around the acute edges of the ribs and into the acute angles of the grooves of the cooperating pairs 1—2 of fluted rolls.

The fibers F are delivered from the working rolls 5 onto an endless belt conveyer 12, which in turn delivers the fibers F to a series of softening roll pairs 7 and 8, shown in Fig. 1b. These rolls are of the spirally fluted type but are smaller in diameter than the rolls 1—2 of the breaker 10. There is a relatively large number of roll pairs 7—8 in the softening set 13, which continue the vertical and lateral flexings of the fibers, with the fibers being worked by the acute edges and acute angles of the ribs and valleys between the ribs on the rolls 7 and 8.

As clearly shown in Fig. 3b, the working of the fiber mass thins the mass vertically and causes it to spread laterally, and more or less opens up the fibers so that the great majority of the powdered lignin is worked out of the mass. This, together with the acute bending of the fibers, causes the fibers to become relatively soft.

The last pair of softening rolls 7 and 8 deliver the fibers F which are then substantially free of lignin, as shown in Figs. 11 and 12, between feed rolls 14 and 15, which in turn feed the fibers endwise across a fixed blade 16 of a cutter unit 17. The cutter unit 17 also includes a rotary reel 18 which is provided with cross blades 19, 19 arranged to cooperate with the fixed blade 16 to cut the fibers into uniform staple length.

The cut fibers pass down an incline 20 onto a belt conveyer 21. The conveyer 21, as shown in Fig. 1b, passes along and under the softening roll set 13 and picks up any short fibers that may have fallen from between the rolls 7 and 8, and also, as noted, receives the cut fibers from the chute 20.

The conveyer 21 delivers the cut fibers to a willow 22, as shown in Figs. 1c and 5. The cut fibers are delivered to a drum 23 which is provided with radially extending blunt teeth 24. These blunt teeth or studs cooperate with similar teeth or studs 25 on the receiving chute 26 of the willow. The cooperating teeth 24 and 25 tend to break up any matted lumps of the cut fibers.

The fibers are delivered by the drum 23 to the periphery of a frusto-conical roll 27, which is also provided with blunt teeth or studs 28. The teeth or studs 28 on the drum 27 cooperate with fixed blunt teeth or studs 30 carried by the inside wall of the casing of the willow. This operation spreads out the fibers and releases any and all remaining loose lignin powder therefrom. The loose powdered lignin and other dust is drawn out of the willow through a conduit 31 attached to a suitable evacuator, thereby thoroughly cleaning the fibers.

The cleaned cut fibers pass or are blown, by centrifugal air force created by rotation of the willow roll 27, through a conduit 32 to a receiving or storage hopper 33, which is also provided with a dust evacuator conduit 34. In the hopper 33 is a toothed feed apron 35 which lifts a layer of the fibers out of the feed hopper. A rotary evener 36 spreads the fibers in a more or less even layer on the spiked apron 35 which delivers the fibers to a chute 34a, the fibers being stripped from the spikes of the apron 35 by a rotary stripper reel 37.

The fibers, in more or less loose sheet form, are then delivered by the chute 36 to an endless belt 38, which feeds the sheet of loose fibers between a pair of feed rolls 39 and 40 of a shredding apparatus 41, shown in Figs. 1c and 6. The feed rolls 39 and 40 are fluted and pass the sheet outwardly therefrom into the path of a series of rotating shredding knives 42 which are carried on the periphery of a rotary drum 43.

The shredder 41 has the effect of combing out the cut fibers into more or less straight parallel relationship as they are advanced endwise by the rolls 39 and 40 into the path of the rotating knives 42. This straightening is further accentuated by toothed working rolls 44, such as are found in a carding or a garnett machine.

The straightened fibers are delivered onto a platform 45 in the delivery end 46 of the shredder 41, practically devoid of any lignin and in a soft condition suitable for use alone or for mixing with wool or other fibrous stock to be made into yarn etc.

A current of air created in the discharge conduit 47 by a suitable blower 48, draws the finished fibers out of the discharge chamber 46 of the shredder 41 and delivers them, through a discharge conduit 49, to a stock mixing machine, to a baler, or to any other suitable place or apparatus for future use or further processing.

In the case of ramie, a fragment of which is shown in Fig. 15, the stalks R are laid endwise on an endless belt 50, see Fig. 13a, which delivers the stalks to a pair of feed rolls 51 and 52 of a preliminary set 53 of cooperating pairs of spirally fluted breaker rolls 54—55 which are similar to the fluted rolls 1 and 2 or 7 and 8 previously noted, preferably the latter, to bend the stalks between the ribs of one and the grooves of a cooperating roll and thereby reduce the stalks from the substantially round cross sectional shape, shown in Fig. 16, through the succeeding steps shown in Figs. 17, 18, 19, 20 and 21, whereby the pithy heart H and the woody structure W surrounding the heart are broken down within the cambium bark C. The cambium bark C is made up of the fibers F which are to be retrieved. The outer bark O is also broken down into a more or less powder form during the passage of the stalks R through the set of preliminary rolls 53.

Strips S of the cambium bark composed of the fibers F bound together by lignin L, in the form substantially shown in Fig. 22, are delivered by the last pair of rolls 51 and 52 of the preliminary set 53 to a belt conveyer 56 which delivers the mass to and between a pair of feed rolls 57 and 58 of a softening set 59 composed of cooperating pairs of spirally fluted rolls 60 and 61.

In the set 59, the fibers F held together by the lignin L are worked in substantially the same manner as the redwood fibers to release the fibers from the lignin. That is, the fibers are worked between the acute edges of the ribs and the acute angles of the recesses of the spirally fluted rolls 60 and 61 until substantially all of the lignin is powdered and the powder is worked out of the mass, as shown in Fig. 23.

The fibers are delivered from the set 59 to a pair of rolls 62 and 63 which form the feed rolls of a gill 64. The gill 64 is composed of bars 65 from which project vertically extending pins 66. The individual bars 65 travel in an upper horizontal plane from the rolls 62 and 63, in the direction of the arrow a, toward a pair of rolls 67 and 68 and then drop successively to a lower plane where they return in the direction of the arrow b to a position adjacent the rolls 62 and 63. Here the bars 65 are raised from the lower plane to the upper plane for a repeat of the cycle.

In raising the bars 65, the teeth 66 enter the mass of fibers which are passing out from between the rolls 62 and 63. The bars 65 move in the direction of the arrow a at a higher rate of speed than the peripheral speed of the rolls 62 and 63, whereby a combing or gilling action takes place, which tends to straighten out the fibers in substantially parallel relationship. The rolls 67 and 68 move at a greater peripheral speed than the rolls 62 and 63 and the travel of the bars 65. Thus, the fibers as a group are pulled and held tautly between the two sets of rolls during the gilling action, the individual fibers being shorter than the distance between the rolls 62—63 and 67—68.

The rolls 67 and 68 deliver the gilled fibers to an endless belt 69 as shown in Fig. 13a. The belt 69 delivers the fibers endwise to the feed rolls 14 and 15 of a cutter unit 17, which is of the same character as the cutting unit previously described.

The cutter 17 chops the fibers into uniform staple lengths. These fibers are delivered by a belt 21a to a storage, receiving, or feeding hopper 33 of the same general character as previously described.

In this case the fibers entering the hopper 33 are subjected to a moistening by an atomizing spray 70. The apron 35 delivers the fibers to an endless belt 38a, which in turn delivers the fibers to a shredding unit 71. In this instance, the shredding unit is in the form of a carding or garnett machine and includes main cylinders or swifts 72 and 73 provided with the usual toothed clothing. The unit 71 also includes the usual assemblage of toothed worker rolls 74 and toothed stripper rolls 75, the fibers being taken off the first swift 72 and placed on the second swift 73 by a doffer or transfer roll 76. In this unit the fibers are combed out and laid parallel as in ordinary carding or garnetting. The straightened fibers are taken off the swift 73 by a doffer roll 77 from which the fibers are stripped by a stripper roll 78 located in a chamber 79.

The fibers are evacuated from the chamber 79 through a conduit 80 placed under suction by an evacuator 81 which draws air from the interior of a rotary perforated drum 82, leaving the fibers disposed on the outside of the drum 82 within a casing 83, as shown in Fig. 14. Suction through the perforations of the drum 82 is prevented in one segment of the circumference of the drum by an imperforate shoe 84. This releases the fibers from the influence of the air currents and permits them to drop from the chamber 83 into a suitable baler 85.

In the case of the ramie the willow is eliminated and what powdered lignin is mixed with the fibers after they are delivered from the cutter 17, falls through the perforated platform 86 over which the fibers are dragged by the conveyer 21a, thus the fibers are subjected to a cleaning which corresponds to the cleaning the redwood fibers received in the willow 22.

In the case of the redwood bark, it is preferable to work it, according to the present invention, while in its natural state, i. e. while it retains its natural moisture content, without any artificial drying. In the case of ramie, it is preferable to work the stalks while in a dry state, subsequent to natural drying in the atmosphere or after artificial drying to the desired degree.

We claim:

The process which consists in taking fibrous plants or longitudinal sections thereof while in a natural state and without preliminary retting or other processing freeing the fibers thereof from a natural relatively solid compact growth formation composed of said fibers and matter extraneous thereto by continuously bending said formation while in a relatively dry state with a moisture content not exceeding the natural moisture content of the plant with said bending being effected transversely to the fiber grain of the formation in opposite directions alternately in one plane and simultaneously in a plane at right angles to the first said plane until at least a portion of said extraneous matter is reduced to relatively fine particles and until substantially all of said matter including such particles falls from said fibers during said bendings without assistance in addition to said bendings, to prepare said fibers for future use or further processing.

WILLIAM F. BOKUM.
JOHN H. SENIOR.